(No Model.)

E. BURKE.
SUBSTITUTE FOR CRANK MOTION.

No. 275,988. Patented Apr. 17, 1883.

WITNESSES
Samuel E Thomas.
N S Wright.

INVENTOR
Edward Burke
By W. W. Leggett.
Attorney

UNITED STATES PATENT OFFICE.

EDWARD BURKE, OF BERNARD, IOWA.

SUBSTITUTE FOR CRANK-MOTION.

SPECIFICATION forming part of Letters Patent No. 275,988, dated April 17, 1883.

Application filed February 24, 1883. (No model.)

*To all whom it may concern:*

Be it known that I, EDWARD BURKE, of Bernard, county of Dubuque, State of Iowa, have invented a new and useful Improvement in Substitutes for Crank-Motion; and I declare the following to be a full, clear, and exact description of the same, such as will enable others skilled in the art to which it pertains to make and use it, reference being had to the accompanying drawings, which form a part of this specification.

My invention consists in the combination of devices and appliances hereinafter specified, and more particularly pointed out in the claims.

Figure 1:
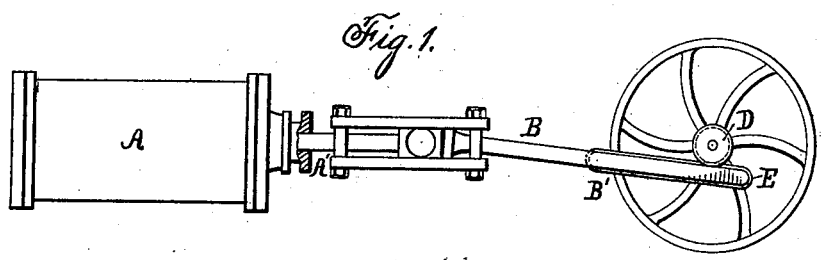
Figure 2:
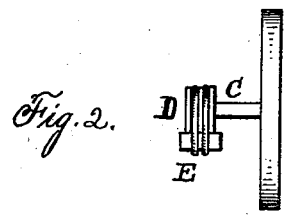
Figure 3:
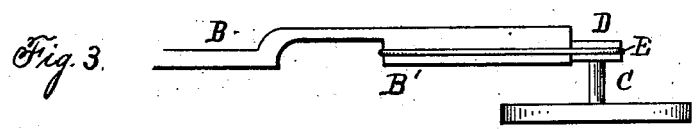
Figure 4:
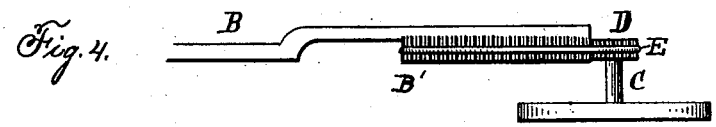
Figure 5:
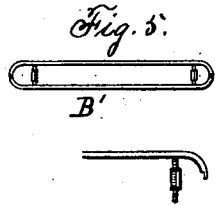

In the drawings, Figure 1 is a side elevation of the device embodying my invention. Fig. 2 is an end view of the same. Fig. 3 is a plan view. Fig. 4 is a variation. Fig. 5 is a separate view of one of the parts.

The object of my invention is to provide improved mechanism for transmitting power from a pitman-rod and analogous devices to a rotary shaft, which shall do away with the crank-motion and substitute therefor a reciprocating rectilinear motion, whereby the shaft will be rotated with less friction, and in which the same leverage shall be quite uniformly exerted, together with any desired length of stroke, without said pitman-rod being thrown very much out of line.

In carrying out my invention, A is a cylinder of an ordinary engine.

A' is the piston-rod.

B is the pitman.

C is the shaft.

I design to construct the end of the pitman adjacent to said shaft substantially as shown in Fig. 3, with a longitudinal shoulder, B', preferably provided with one or more tracks.

D is a pulley rigidly secured to the end of the shaft C.

E represents one or more belts or cables, of any suitable material—as, for instance, a wire rope—secured upon the pulley D, and over the shoulder of the pitman-rod B', said belts or cables being crossed in their adjustment upon the pulley and the shoulder of the pitman-rod, the construction being such that as the pitman is forced to and fro it will communicate its power by means of said cables to the pulley and the shaft to which it is secured. As the pitman travels to and fro about the pulley, it is evident that it will only be thrown out of line half the diameter of the pulley. In order to make the cables sufficiently taut in their adjustment upon the pulley and the shoulder of the pitman, it is evident that any suitable means may be employed. For instance, for lighter mechanism the shoulder of the pitman may be constructed of two plates of iron, provided with a solid body of rubber between them, the construction being such that said plates, with the intermediate rubber, could be compressed until the belt is adjusted thereon, when, by loosening the compression, the expansion of the rubber would tighten the belt. In heavier machinery, however, a screw would be preferable between said plates, by which the width of the shoulder could be suitably increased after the adjustment of the cables, as shown in Fig. 5.

As illustrated in Fig. 4, it is evident that the shoulder of the pitman may be also provided with one or more rows of cogs, adapted to mesh with similar cogs upon the periphery of the pulley, by means of which power may be transmitted from the pitman to the pulley and shaft, the cables at the same time serving to hold the pulley in mesh with the cogs upon said shoulder and aiding in the transmission of power to the shaft.

I would have it understood that I design to construct the shoulder of the pitman and the pulley either with or without these cogs, for they may be used or dispensed with without departing from the principle of my invention.

I design to use as many cables as may be desired with different varieties and hefts of machinery.

It is obvious that this method of transmitting power may be employed anywhere where it is desired to transmit a reciprocating into a rotary motion—as, for instance, in steam-engines, sewing-machines, pumps, and other analogous devices.

I have described this invention more particularly as adapted to convert a reciprocating into a rotary motion; but it will be observed that the improved mechanism is equally well adapted to convert a rotary into a reciprocating motion, for power communicated to a rotary shaft can by this mechanism be transmitted to a reciprocating arm or pitman. It may also be applied where power is transmitted from a reciprocating into a rotary motion by means of an eccentric, and vice versa.

In the use of this device much power lost in the use of cranks is saved, while by the same power a much greater force and a more regular motion are exerted.

What I claim is—

1. A device for converting a reciprocating to a rotary motion, and vice versa, consisting of the combination, with a pitman provided with a suitable track, of a shaft provided with a suitable pulley, said pulley connected to said pitman by means of one or more cables, the construction being such that the end of the pitman may travel about said pulley and communicate its power thereto, substantially as and for the purpose described.

2. The combination, with a pitman provided with a longitudinal shoulder upon one end, of a shaft provided with a pulley, said pulley connected with said pitman by means of one or more cables, the construction being such that the shoulder of the pitman may travel about said pulley and communicate its power thereto, substantially as described.

3. The combination, with a pitman provided with a suitable track, of a rotary shaft provided with a suitable pulley, said pulley and track constructed with cogs adapted to mesh with each other, and in connection therewith one or more cables connecting said shoulder and pulley, substantially as and in the manner described.

4. The combination, with a pitman, of a rotary shaft provided with a suitable pulley, said pulley connected with said shoulder by means of one or more cables, the construction being such that said pitman may travel about said pulley and communicate its power thereto, and in connection therewith means by which cables may be suitably tightened, substantially as described.

In testimony whereof I sign this specification in the presence of two witnesses.

EDWARD BURKE.

Witnesses:
 N. S. WRIGHT,
 WILLIAM F. FORD.